(12) United States Patent
Asbeck et al.

(10) Patent No.: US 8,330,410 B2
(45) Date of Patent: Dec. 11, 2012

(54) CHARGER FOR MINIMAL-POWER CONSUMERS HAVING A HOUSING WITH A PHOTOVOLTAIC ELEMENT CONNECTABLE TO CHARGING ELECTRONICS

(75) Inventors: Frank H. Asbeck, Bonn (DE); Michael J. Schmidt, Bonn (DE)

(73) Assignee: Solarworld AG, Bonn (DE)

( * ) Notice: Subject to any disclaimer, the term of this patent is extended or adjusted under 35 U.S.C. 154(b) by 1066 days.

(21) Appl. No.: 12/164,516

(22) Filed: Jun. 30, 2008

(65) Prior Publication Data

US 2009/0045781 A1 Feb. 19, 2009

(30) Foreign Application Priority Data

Aug. 14, 2007 (DE) .................... 20 2007 011 384 U
Apr. 24, 2008 (EP) .................................... 08007951

(51) Int. Cl.
*H01M 10/46* (2006.01)
(52) U.S. Cl. ........................................................ 320/101
(58) Field of Classification Search .................. 320/101, 320/103, 111, 114, 115, 138; 136/244, 251, 136/292, 293; 323/906
See application file for complete search history.

(56) References Cited

U.S. PATENT DOCUMENTS

| 5,780,993 | A | 7/1998 | Tsang | |
|---|---|---|---|---|
| 6,454,578 | B1 * | 9/2002 | Yao | 439/131 |
| 7,565,968 | B2 * | 7/2009 | Lindley | 206/223 |
| 2003/0094921 | A1 | 5/2003 | Lau et al. | |
| 2004/0204179 | A1 | 10/2004 | Hsu | |
| 2004/0239287 | A1 * | 12/2004 | Batts-Gowins | 320/103 |
| 2007/0261732 | A1 * | 11/2007 | Liao | 136/256 |
| 2008/0157712 | A1 * | 7/2008 | Garcia | 320/101 |
| 2008/0252251 | A1 * | 10/2008 | Joasil | 320/101 |
| 2009/0096399 | A1 * | 4/2009 | Chen et al. | 320/103 |

FOREIGN PATENT DOCUMENTS

| CN | 2350916 Y | 11/1999 |
|---|---|---|
| DE | 29518222 U1 | 1/1996 |
| DE | 29924739 U1 | 7/2005 |

OTHER PUBLICATIONS

Search Report issued Nov. 28, 2011 in EP Application No. 08007951.1.
Office Action issued Feb. 17, 2012 in CN Application No. 200810129963.6 (English translation only attached).

* cited by examiner

*Primary Examiner* — Edward Tso
(74) *Attorney, Agent, or Firm* — Panitch Schwarze Belisario & Nadel LLP

(57) ABSTRACT

The present invention relates to a charger for minimal-power consumers, such as mobile phones or the like, comprising a plug for connection to a mains supply, a housing for accommodating the charging electronics and a charger cable for connection to the minimal-power consumer, said plug being fixedly connected to one side of the housing. For providing a charger of the type specified at the beginning, which allows charging of the minimal-power consumer even if an adequate mains supply should not be available, the present invention is so conceived that another side of the housing is provided with a photovoltaic element which is connected to the charging electronics.

10 Claims, 11 Drawing Sheets

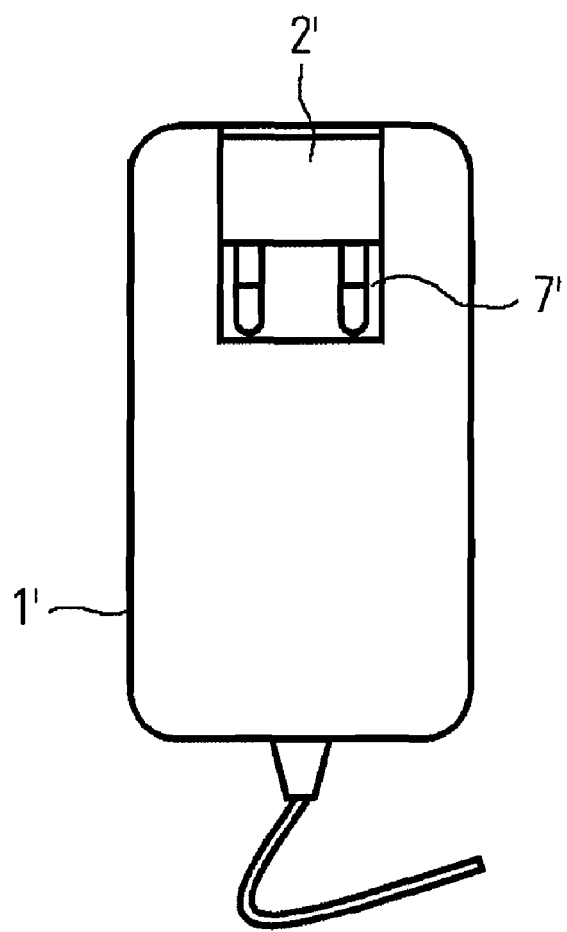 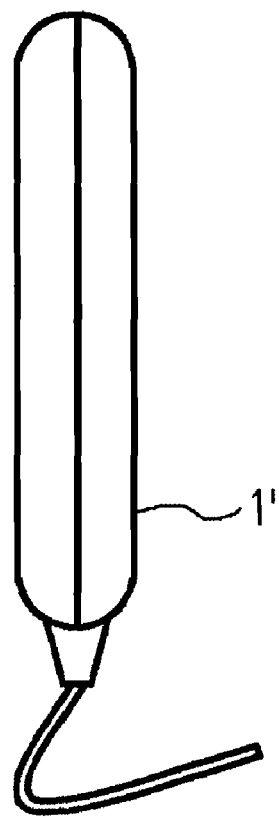
*FIG.13a*  *FIG.13b*

CHARGER FOR MINIMAL-POWER CONSUMERS HAVING A HOUSING WITH A PHOTOVOLTAIC ELEMENT CONNECTABLE TO CHARGING ELECTRONICS

The present invention relates to a charger for minimal-power consumers, such as mobile phones or the like, comprising a plug for connection to a mains supply, a housing for accommodating the charging electronics and a charger cable for connection to the minimal-power consumer, said plug being fixedly connected to one side of the housing.

Such chargers are normally provided for the 220 volt or 110 volt mains supply. The housing has normally provided therein a transformer as well as charging electronics. However, such chargers also exist for 12/24 volt mains supplies, e.g. on-board supply systems of a motor vehicle or the like.

Although these chargers have become widely accepted, since they can be handled easily and without any problems, they entail the disadvantage that they can only be used for specific mains and that the minimal-power consumer cannot be operated when an adequate mains supply is not available.

It is therefore the object of the present invention to provide a charger of the type specified at the beginning, which allows charging of the minimal-power consumer even if an adequate mains supply should not be available.

According to the present invention, this object is achieved in that another side of the housing is provided with a photovoltaic element which is connected to the charging electronics.

This solution has the advantage that, even if an adequate mains supply should not be available, the charger can be fed via solar current and will thus be able to charge the minimal-power consumer. It is true that the charging current may perhaps be lower and the charging of the minimal-power consumer may therefore take more time, but normally immediate operation of the mobile phone or of some other minimal-power consumer will be possible so that the user will find immediate help in respective emergency situations.

According to a preferred embodiment of the invention, the plug is arranged on one side such that it is displaced from the middle of the longitudinal dimension of said side, the photovoltaic element being arranged on the housing side which is located opposite to the plug. This mode of arrangement allows the housing of the charger to be placed onto the side where the plug is provided, whereby the photovoltaic element will be oriented at an oblique angle, preferably an angle of from 25-30°. It is thus possible to cause the photovoltaic element to follow the position of the sun in such a way that the highest possible efficiency will be achieved.

It will be advantageous when the respective side is almost fully covered by the photovoltaic element.

According to a specially preferred embodiment, the housing side in question is defined by the photovoltaic element itself.

It proved to be particularly advantageous when the housing has additionally provided therein a storage battery which serves as a temporary store. The photovoltaic element is connected to the storage battery via the charging electronics so that the charging current will flow via the photovoltaic element not only when the minimal-power consumer is connected to the charger, but independently of said connection. This allows the charger, i.e. the storage battery provided as a temporary store, to be precharged even if the respective photovoltaic element should be less powerful so that the actual charging operation of the minimal-power consumer will take place in an adequately short period of time.

In addition, such a storage battery used as a temporary store allows a mobile phone to be charged in cases where neither a mains supply nor sufficient light is available.

Another embodiment is so conceived that one side of the housing can be opened up and that the photovoltaic element is arranged on the inner surfaces of the housing side that can be opened up. This has the effect that the area of the photovoltaic element will be enlarged. In addition, the photovoltaic element is, prior to being used, arranged in the interior of the housing and is therefore protected.

An expedient embodiment can also be so conceived that the charger comprises a connection socket for receiving dc lines therein. This connection socket and the charger cable are arranged, preferably symmetrically, on one side of the housing. Said connection socket can be closed by a rubber nipple and protected against the ingress of liquid and dust by said nipple. By means of this connection socket, additional devices, such as an MP3 player, can be operated with this charger. Said additional devices are then simply connected to the connection socket of the charger via adapters or cables.

Still another embodiment is so conceived that the plug is implemented as a foldable plug and that it is adapted to be turned from a transport position, in which the pins of the plug are arranged adjacent the housing, to a charging position in which the pins of the plug are directed away from the housing. The charger will thus require less space in its transport position and the pins of the plug will be protected.

A particularly good protection of the plug and of the pins of the plug can be achieved in that the housing has provided therein a recess for accommodating the foldable plug in the transport position. In the transport position, the outer surface of the plug is preferably flush with the outer surface of the housing. It follows that, when occupying its transport position, the plug is enclosed by the housing on three sides thereof and is therefore particularly well protected. In addition, the space required is reduced still further.

According to a specially preferred embodiment, the foldable plug is adapted to be pivoted over a range of approx. 180° and to be locked in position at various operating positions. For example, a first operating position is possible, at which the plug encloses an angle of 90° with the lower surface of the housing, i.e. the housing side which is located opposite the photovoltaic element. At this first operating position, the charger can be supported in an elevated position on the plug so that the photovoltaic element will be oriented obliquely and enclose an angle of approx. 25°-30° with the horizontal. It follows that the first operating position of the photovoltaic element is particularly suitable for the photovoltaic charging operation.

At a second operating position, the plug could be folded out still further so that it will project outwards beyond a face side of the housing and enclose an angle of 180° with the lower surface of the housing. This second operating position is particularly suitable for a mains charging operation, since the charger can be inserted in a socket in a space-saving manner.

In the following, embodiments of the present invention will be explained in detail on the basis of a drawing, in which.

Figure 7:
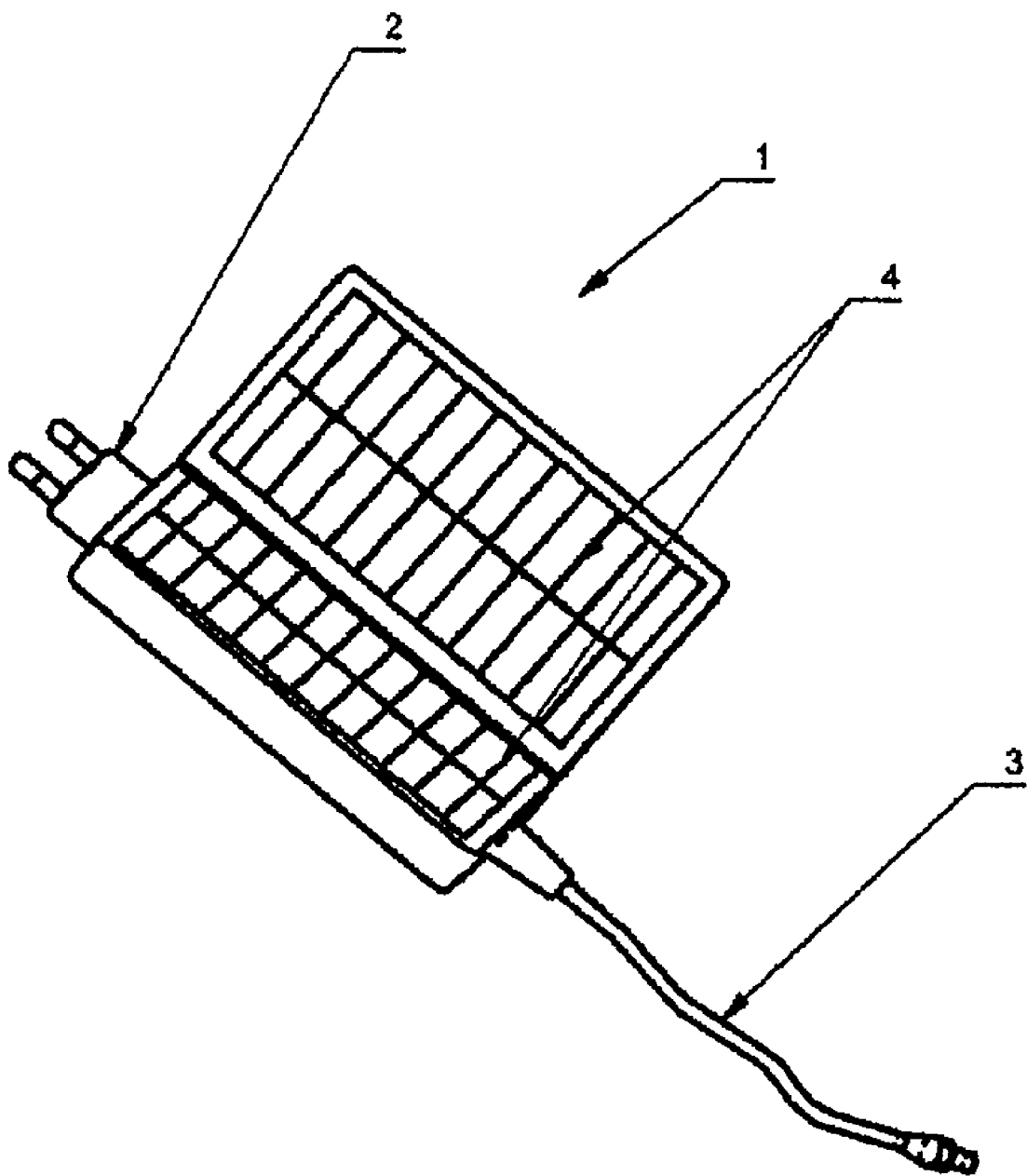
Figure 8:
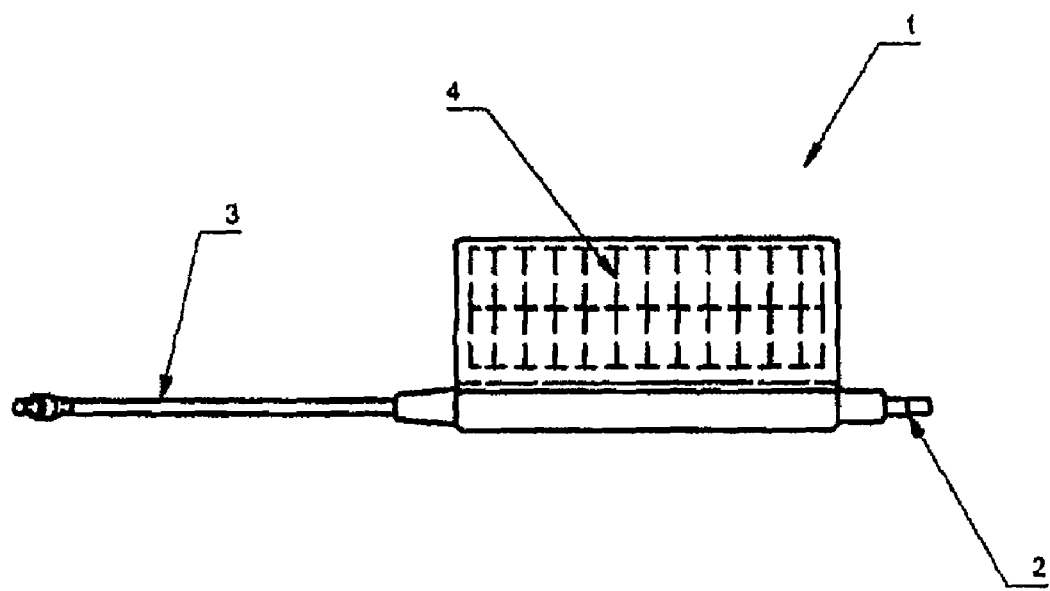
Figure 9:
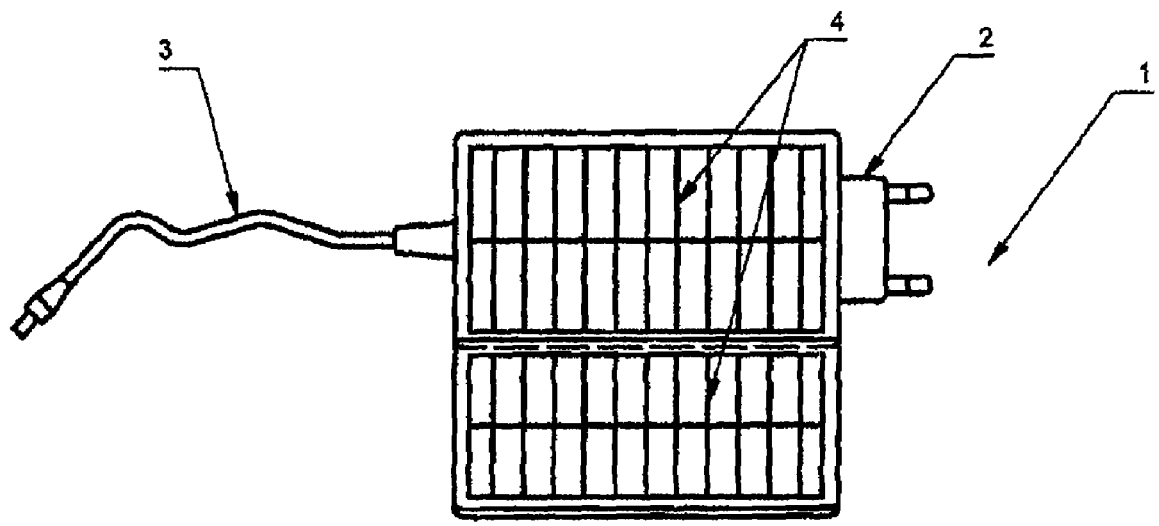
Figure 10:
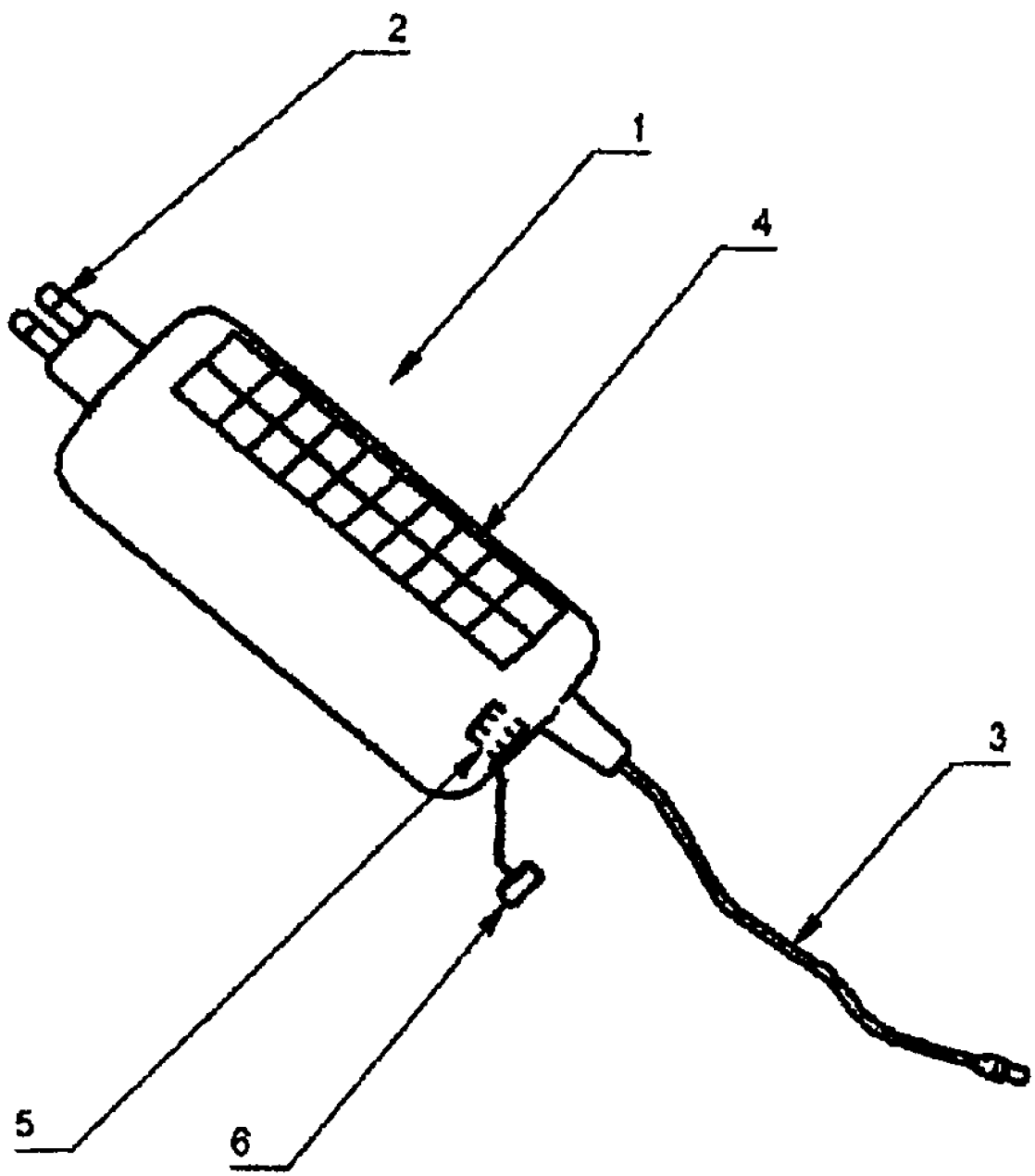
Figure 11:
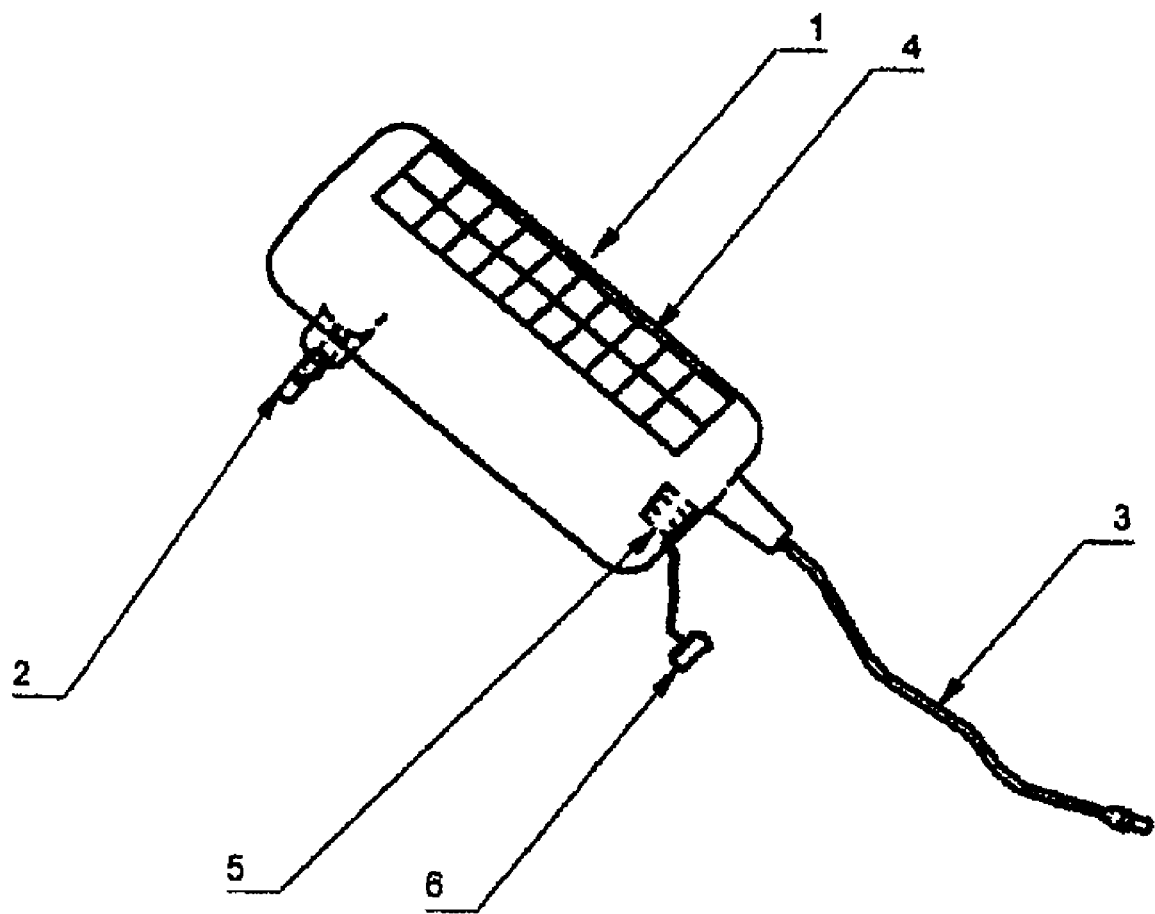
Figure 12:
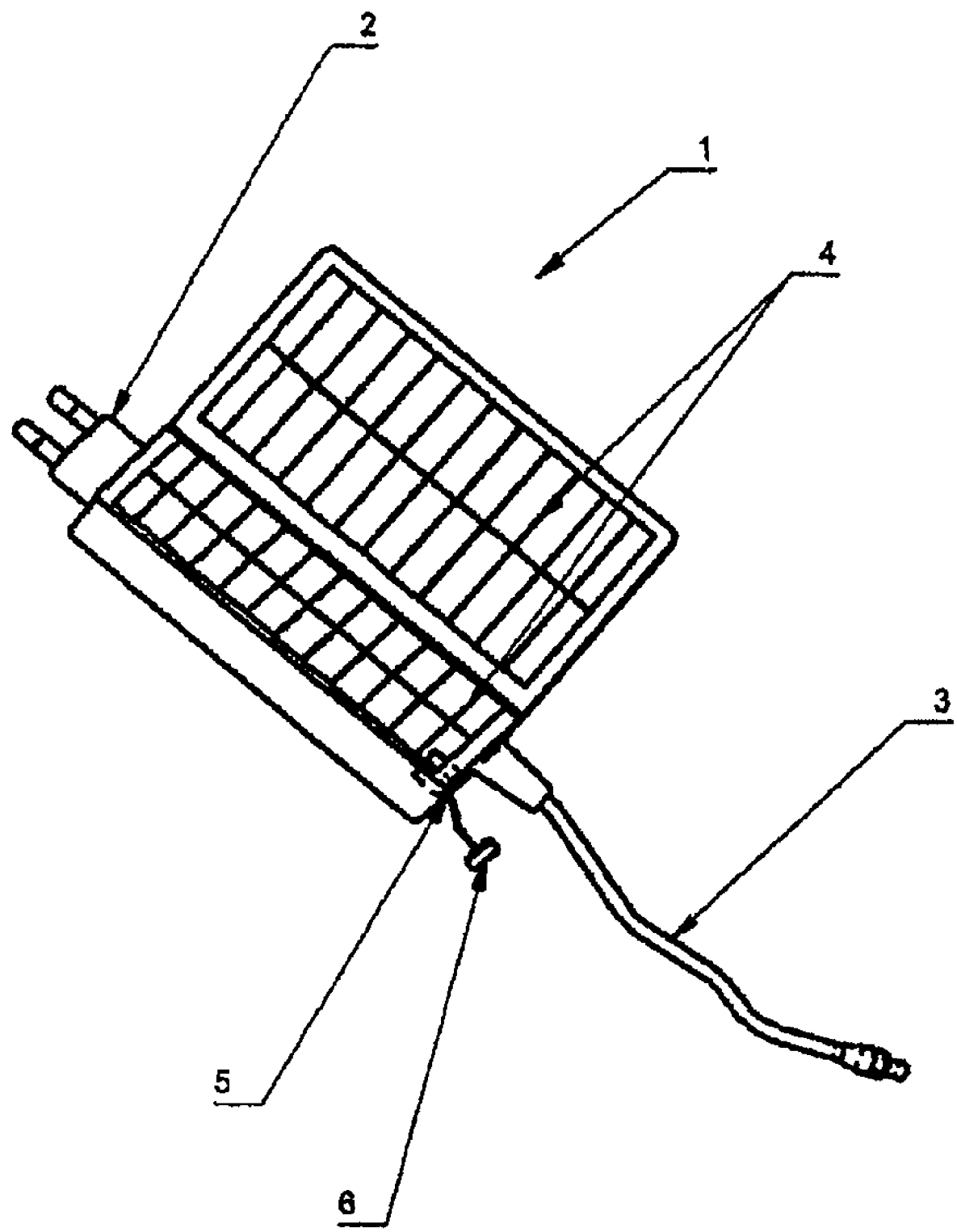

FIG. 7 shows a charger according to still another embodiment in a perspective view, FIG. 8 shows the charger according to FIG. 7 in a side view, FIG. 9 shows the charger according to FIG. 7 in a top view, FIG. 10 shows a charger according to another embodiment, FIG. 11 shows a further charger according to another embodiment, FIG. 12 shows a charger according to still another embodiment, and FIGS. 13a-13e show various views of a charger with a foldable plug.

As can be seen from the drawing, the charger essentially consists of a housing 1 having the shape of a rectangular parallelepiped in the present case and of a plug 2 as well as a charger cable 3. The plug 2 is fixedly attached to one of the main sides of the rectangular parallelepiped so that the plug 2 is inserted, together with the housing 1, which simultaneously defines the plug housing, into the socket of a 220/110 volt mains supply. The housing 1 itself accommodates a power supply unit, which is known per se, and charging electronics; these components are not shown in detail. The connection to a minimal-power consumer, in the present case a mobile phone, is established, as usual, by a charger cable 3 having a user-specific connector or a universal connector provided at the end thereof.

Figure 1:
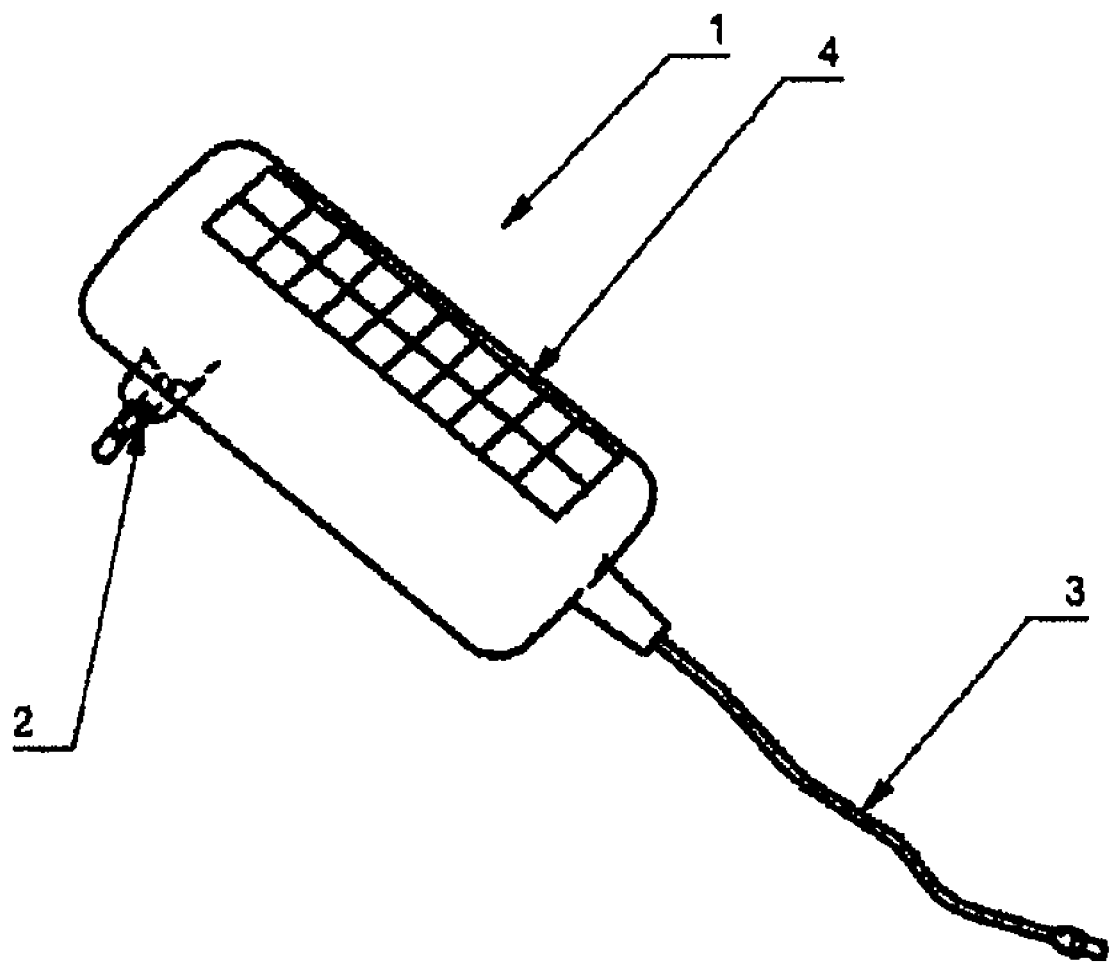
FIG. 1 shows a first embodiment of a charger in a perspective view.
Figure 2:
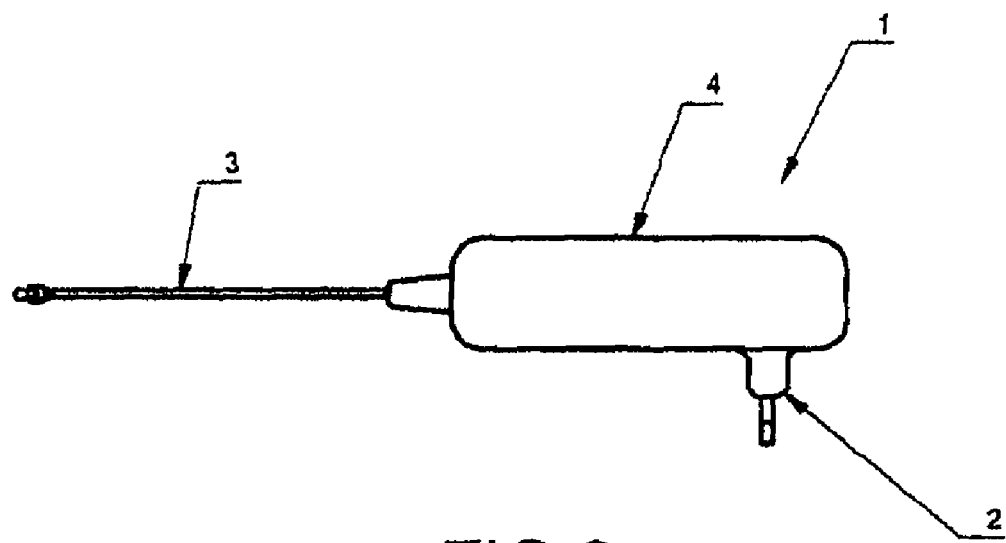
FIG. 2 shows the charger according to FIG. 1 in a side view.
Figure 3:
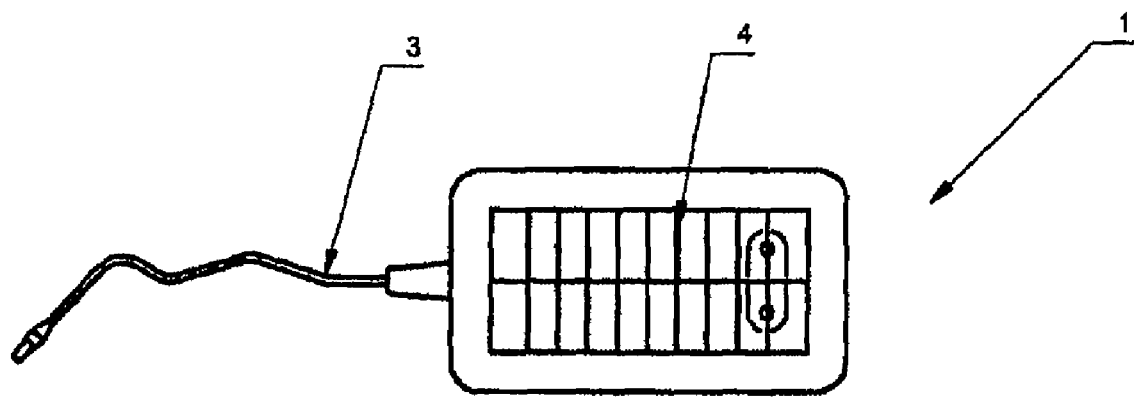
FIG. 3 shows the charger according to FIG. 1 in a top view.

In the first embodiment shown in FIGS. 1 to 3, a photovoltaic element 4 is provided on the housing main side located opposite the plug 2. This photovoltaic element 4 occupies essentially the whole side of the housing 1. In the present case, the respective side of the housing 1 is even defined by the photovoltaic element 4 itself. The off-centre mode of arrangement of the plug 2 on one of the main sides of the housing allows the charger to be supported in an elevated position on the plug, when it is not inserted in a socket; in this elevated position, it can have an inclination of approx. 30° so that the photovoltaic element can be oriented towards the sun.

Figure 4:
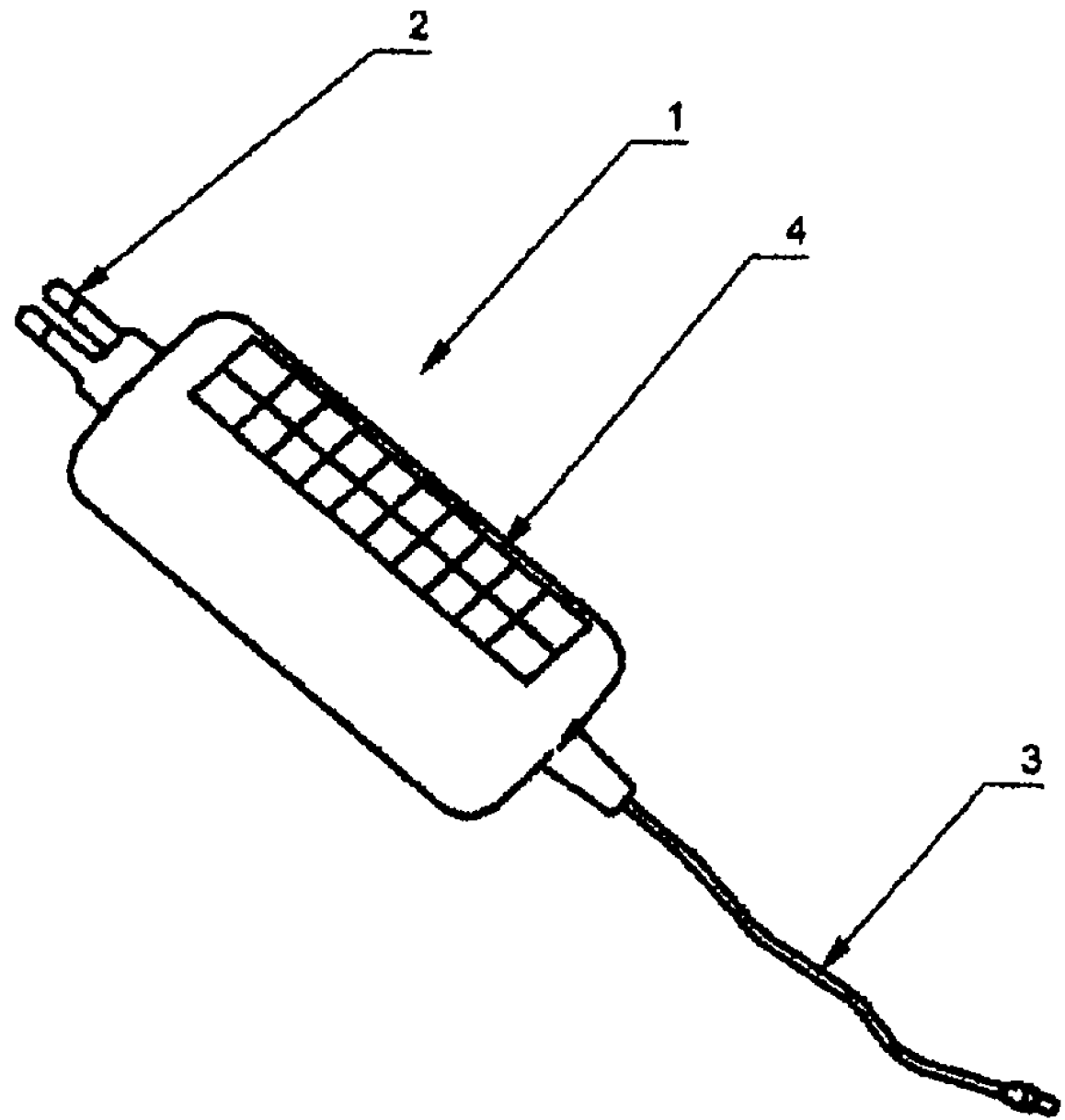
FIG. 4 shows a charger according to another embodiment in a perspective view.
Figure 5:
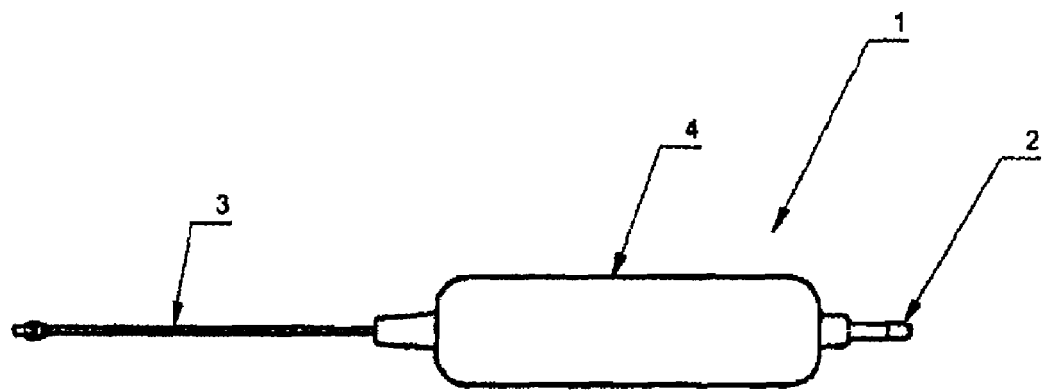
FIG. 5 shows the charger according to FIG. 4 in a side view.
Figure 6:
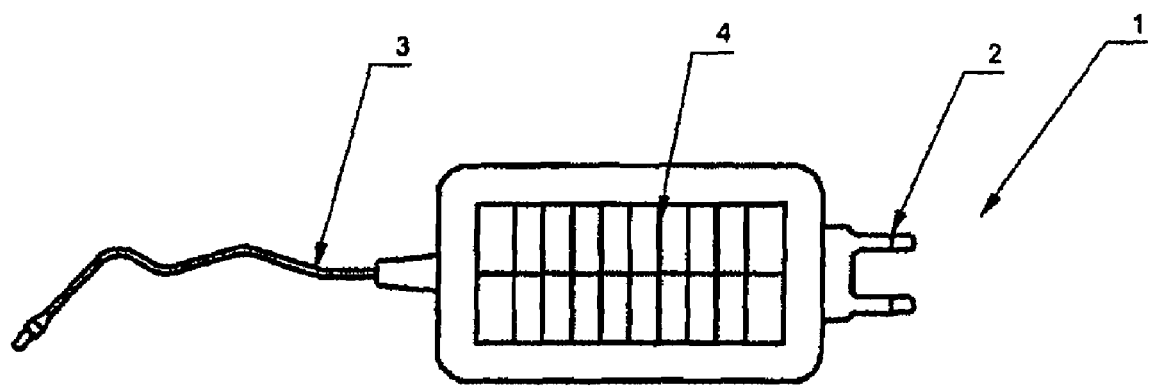
FIG. 6 shows the charger according to FIG. 4 in a top view.

In the embodiment according to FIGS. 4 to 6, the plug is arranged on the narrow side of the housing, viz. on the side located opposite the charger cable. The photovoltaic element is arranged on a side which is delimited by the plug side and the charger-cable side.

As is not shown in detail in the drawing, the photovoltaic element is connected via the charging electronics to storage batteries accommodated in the housing 1 and used as temporary stores. These temporary stores allow the mobile phone to be recharged within a comparatively short period of time even in the case of a small-sized photovoltaic cell, since the storage battery accommodated in the charger will be discharged first; this storage battery can then be recharged by the solar cell. The arrangement of the plug on a face side or narrow side of the housing has the advantage that a plurality of such chargers can be attached to a connector strip or plugged into shaver sockets in a hotel.

The storage battery provided can here be a Mignon cell (type AA) or a microcell (type AAA). The charging electronics can, however, also be implemented such that dry cells can be used, if desired.

In FIGS. 7 to 9, a further embodiment of the charger is shown. In this embodiment the main side of the housing 1, on which the photovoltaic element 4 is provided, is adapted to be opened up and the photovoltaic element 4 is arranged on the inner surfaces of the main side that can be opened up. The area of the photovoltaic element 4 will be doubled in this way. When the photovoltaic element 4 is not needed, the main side will be closed and the photovoltaic element will be protected against shocks, damage, etc. As for the rest, the structural design of the charger corresponds to that of the embodiments which have already been described.

The embodiments shown in FIGS. 10 to 12 correspond essentially to the embodiments which have already been shown; hence, only the differences will be described in the following.

As can be seen from FIGS. 10 to 12, each of the chargers shown has, in addition to the charger cable 3, a connection socket 5 for receiving dc lines therein. The outgoing charger cable 3 and the connection socket 5 are arranged symmetrically on one narrow side of the housing 1 so that the charger cable 3 now no longer exits centrally from the narrow side of the housing 1. The connection socket 5 is protected against the ingress of liquid, dust etc. by a removable rubber nipple 6. The connection socket 5 can have inserted therein various adapters or cables so as to operate further devices, e.g. MP3 players, with the chargers.

FIGS. 13a to 13e show various views of a further embodiment of the charger. Also this embodiment corresponds essentially to the embodiments which have already been described; hence, only the differences will be described in the following.

FIG. 13a shows the charger from below. The plug 2' is fixedly attached to the lower surface of the housing 1' so that it cannot be dismounted, i.e. removed from the housing 1'. The plug 2' is, however, implemented such that it is foldable. For this purpose, the plug 2' is connected to the housing 1' preferably via a hinge or a shaft. The plug 2' can be folded about this hinge or shaft and transferred from a transport position to at least one operating position. The plug 2' is foldable, i.e. pivotable preferably over a range of approx. 180°. The hinge or shaft is preferably arranged on a face side of the housing 1'. The position shown in FIG. 13a is the transport position of the charger. In said transport position, the plug 2' is folded inwards so that it is in fitting contact with the lower surface of the housing 1'.

According to a preferred embodiment, a recess 7 is provided in the lower surface of the housing 1'; the plug 2' is accommodated in said recess when it occupies its transport position. As can be seen in FIG. 13b, the plug 2', when occupying its transport position, is fully accommodated in said recess 7 without projecting beyond the housing 1', i.e. the outer surface of the plug 2' is flush with the outer surface of the housing 1'. The plug 2' is well protected at its transport position.

From its transport position, the plug 2' can be transferred to a first operating position. This is shown in FIG. 13c. For this purpose, the plug 2' is pivoted outwards about the hinge or shaft until it is located in a plane which encloses with the lower surface of the housing 1' an angle of approx. 90°, i.e. the pins 8 of the plug 2' will be directed away from the housing 1'. The plug 2' can preferably be arrested at this position. At this position, the charger can easily be propped up on the plug 2' so that it will enclose with the horizontal an angle of approx. 30° and so that the photovoltaic element, which is arranged on the housing side located opposite the plug (cf. FIG. 13d), can be oriented towards the sun. It goes without saying that the charger can also be inserted in a socket in this first operating position.

Figure 13E:
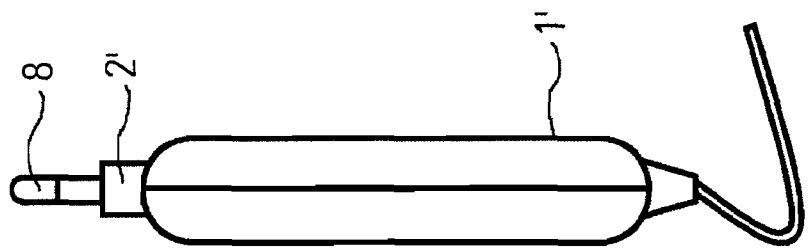
Figure 13D:
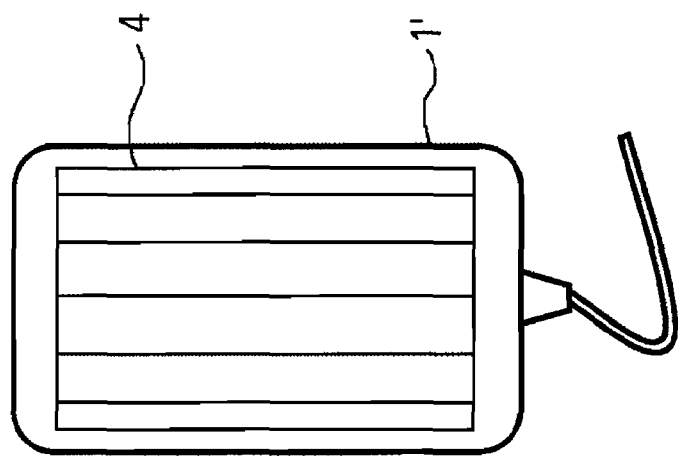
Figure 13C:
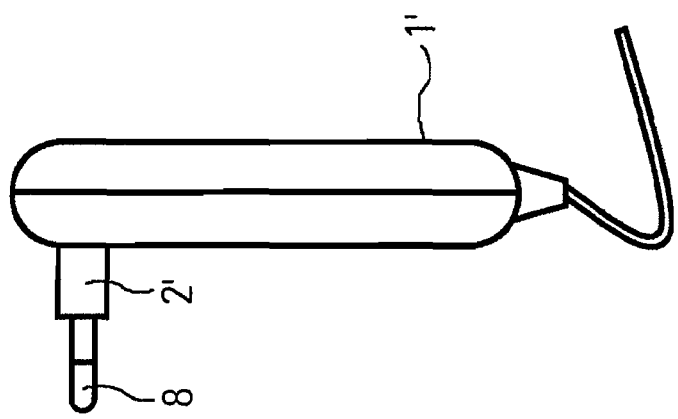

In FIG. 13e, a second operating position of the plug 2' is shown. For transferring the plug 2' to this operating position, it is folded out still further until it is again positioned in one plane with the housing 1' and until the pins 8 of the plug 2' are directed away from the housing 1'. Preferably, the plug can also be arrested in the second operating position. In this second operating position of the plug 2', the charger can also easily be inserted in sockets which offer little space, e.g. in connector strips.

The invention claimed is:

1. A charger for a minimal-power consumer, comprising:
   a plug for connection to a mains supply,
   a housing for accommodating charging electronics, the plug being integral with the housing, and
   a charger cable for connection to the minimal-power consumer, said plug being fixedly connected to one side of the housing and insertable into a socket of the mains supply, another side of the housing bearing a photovoltaic element connected to the charging electronics, the photovoltaic element being integral with and fixedly connected to the housing.

2. A charger according to claim 1, wherein the plug is arranged on one side of the housing such that the plug is displaced from a middle of a longitudinal dimension of said side of the housing, the photovoltaic element being arranged on a side of the housing located opposite to the plug.

3. A charger according to claim 1, wherein the side of the housing bearing the photovoltaic element is almost fully covered by the photovoltaic element.

4. A charger according to claim 1, wherein the housing has provided therein a storage battery which is operatively connected to the photovoltaic element and which serves as a temporary store.

5. A charger according to claim 1, wherein the plug is fixedly attached to a face side of the housing.

6. A charger according to claim 1, wherein one side of the housing can be opened up and the photovoltaic element is arranged on inner surfaces of the housing side that can be opened up.

7. A charger according to claim 1, wherein the charger comprises a connection socket for receiving dc lines therein.

8. A charger according to claim 1, wherein the plug is implemented as a foldable plug and is adapted to be turned from a transport position, in which pins of the plug are arranged adjacent to the housing to an operating position in which the pins of the plug are directed away from the housing.

9. A charger according to claim 8, wherein the housing has provided therein a recess for accommodating the plug in the transport position.

10. A charger according to claim 8, wherein the plug is adapted to be pivoted over a range of approximately 180° and to be locked in position at various operating positions.

* * * * *